Oct. 25, 1932.   G. CICALI   1,885,059
PROCESS FOR PRODUCING PRACTICALLY PURE HYDROGEN
Filed May 15, 1928
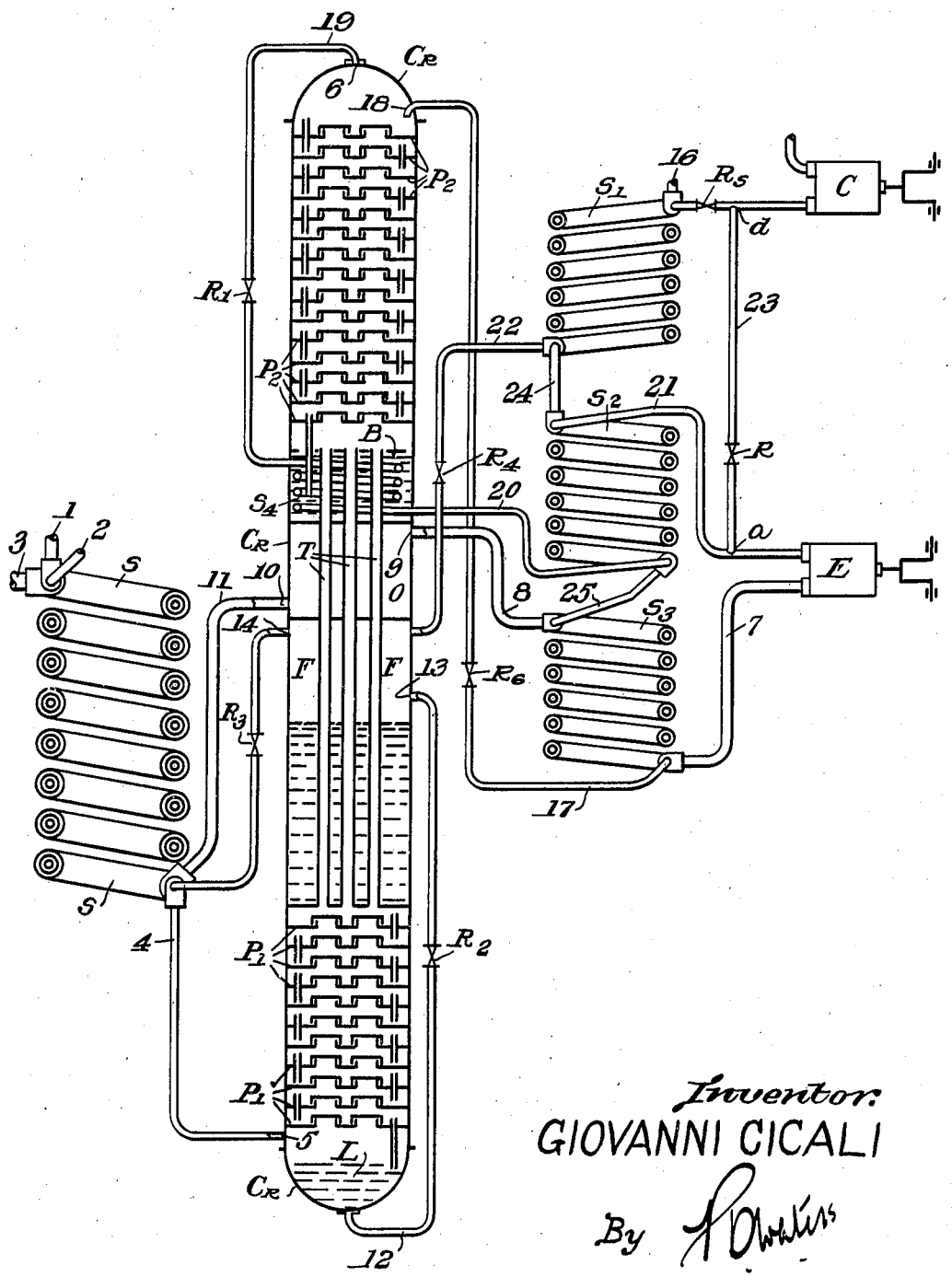
Inventor:
GIOVANNI CICALI
By *[signature]*
Attorney

Patented Oct. 25, 1932

1,885,059

UNITED STATES PATENT OFFICE

GIOVANNI CICALI, OF BOLOGNA, ITALY

PROCESS FOR PRODUCING PRACTICALLY PURE HYDROGEN

Application filed May 15, 1928, Serial No. 277,984, and in Italy June 1, 1927.

This invention relates to a process for producing from mixtures of hydrogen, nitrogen, carbon monoxide, methane and the like, a practically pure hydrogen on a commercial scale, and which is especially free from the deleterious gases originally present in said mixtures. A permissible fixed minimum of nitrogen which is relatively innocuous may remain.

The main object of my invention is to economically produce hydrogen fit for immediate use in the synthesis of ammonia and other synethetic products which require a very high purity of the hydrogen.

Another object is to produce hydrogen in a continuous process from mixtures of hydrogen with various gases which, while being separated, are nevertheless advantageously used in part to definitely assist and continue the process, and in addition to use a portion of the gases to produce work and cooling effects, particularly the hydrogen.

Other objects and the various practical and desirable features of my process will appear more fully in detail hereinafter.

The accompanying drawing illustrates in diagrammatic form an apparatus arranged for carrying out the process in a simple manner, as for example, in the case of water gas.

Hydrogen which is practically pure is a valuable product for the synthesis of several synthetic substances, one of which is ammonia. However, the sources of commercial hydrogen are usually found in the combustion or destructive distillation of coal, wood, oils or other substances, all of which do not produce hydrogen alone. Some very likely products of such sources are water gas, coke furnace gas, etc., all of them mixtures of hydrogen with more or less carbon monoxide, carbon dioxide, sulfur dioxide, hydrogen sulfide, water and various other deleterious gases. Such gaseous mixtures form the raw material or starting mixtures from which hydrogen may be obtained by the present process. The problem is to remove even the last traces of one or more deleterious gaseous compounds (CO, CH$_4$ for instance) from a gaseous mixture in which they are contained, such as mentioned, and it is necessary to resort, not only to the mutual relative mingling capacity of the said gases (CO, CH$_4$) and of hydrogen when in liquid condition, but it is necessary to produce still lower temperatures than have thus far been reached industrially. This can be obtained by forming with the elements (H+N for instance) which are less liquefiable than the compounds to be removed (CO, CH$_4$) a physical system containing hydrogen and nitrogen and constituted by two phases, a liquid and a gaseous one, in contact and in equilibrium with each other, boiling at an extremely low temperature, much lower than that of the pure gases (carbon monoxide and methane) to be removed, and by exposing the mixture to be purified (H+N+%CO+%CH$_4$) to the analyzing action of the liquid and extremely cold phase of the said system, the corresponding gaseous phase being utilized to produce work and for cooling purposes.

In the case at issue, the presence of a convenient amount of hydrogen in the said liquid phase (purifying liquid mixture) determines the formation of liquid mixtures of hydrogen, nitrogen, methane (if present) and carbon monoxide which are very far from the point at which freezing would commence; all danger, and therewith also all difficulties arising from the freezing of carbon monoxide, methane and nitrogen are therefore completely obviated.

Having thus fixed the theoretical basis of the process according to the present invention, we now proceed to the analysis of its details. The process consists in submitting the starting mixture (water gas, coke furnace gas, and the like) to a usual preliminary purification as already indicated, compressing the resulting mixture at high pressure and cooling it first outside and then inside of the purifying column with the object of reducing, only by a small amount, its carbon monoxide and methane contents so as to obtain a mixture still rich in carbon monoxide and methane. The method used for this purpose may be selected at will and need not be described here, since it does not form any actual part of the invention.

The problem now is to obtain practically pure hydrogen from this initially purified gas mixture. Various methods have, of course already been proposed for attaining such dissociations, but with said methods generally using liquid or gaseous nitrogen as purifying agent, the extent of removal of carbon monoxide from the hydrogen is not sufficient, as at best hydrogen with 1% or a too high content of carbon monoxide will be obtained which would prejudice the subsequent synthesis of $NH_3$. This is due to the fact that with nitrogen, either liquid or gaseous, whether acting by direct or indirect contact, the mixture cannot be cooled at the low temperature which is necessary for condensing the whole of the CO, even if in the final cooling, as sometimes occurs, the hydrogen issuing from the purifying column is employed and expanded with production of work. With these cooling means an average final temperature of at most $-200°$ C. may be reached i. e. a temperature which is known to correspond to a content of about 1% carbon monoxide, while at least one part in ten thousand is the proportion to be reached, this requiring cooling means which are adapted for producing lower temperatures than the solidifying point of nitrogen, or $-210°$ C. and a purifying medium which is substantially distinct from the nitrogen, in view of the multiple effects it is desired to have it produce. The use of nitrogen, moreover entails the inconvenience of requiring large quantities of liquid or gaseous nitrogen, because a great portion is lost by descending and mingling with the carbon monoxide, and because the liquid nitrogen must also replace all heat losses. The economical efficiency of such processes is thus diminished in proportion to the greater consumption of nitrogen.

Also, in view of the considerable increase of auxiliary nitrogen machines and production apparatus required, which will increase the necessary compression work, aside from complicating the plant not to mention the metallic masses involved, an increased duration of the starting period and other losses will result.

Furthermore, nitrogen alone renders very difficult the control of the operation and subsequent synthesis mentioned previously, as in any case it does not permit of maintaining a constant equilibrium of the phases at the top of the purifying column of the apparatus used or a constant nitrogen content of the gases leaving the apparatus, which feature is indispensable for said control.

The present invention overcomes the said drawbacks and produces results unobtainable by methods used heretofore.

One feature of the process herein is therefore to expose a special mixture or auxiliary purifying medium to direct contact with the gases arising from the purification within the top of the column, this mixture being composed, in view of the multiple results which it is adapted to produce, of two portions in contact with each other and equilibrated or mutually balanced under high pressure in the column and at a lower final average temperature than the solidifying point of N.

The special mixture must contain not only two phases in equilibrium at the said high pressure and low temperature, but also definite predetermined proportions of hydrogen and nitrogen and is produced by compressing a mixture of said gases under high pressure and partially liquefying the same until the desired average of predetermined proportions thereof results.

When this auxiliary mixture has been prepared it is exposed at the upper end of the column mentioned to direct contact with the gases arising from the purification of the mixture to be treated, in order to attain the following immediate objects; to permit and constantly maintain at the upper end of the column a constant equilibrium of gas and liquid, or two phases which are almost identical with those constituting the special auxiliary mixture: to reduce the final purification to a low temperature at which any trace of carbon monoxide and methane, if present, will vanish by condensation, and finally, to obtain at the outlet of said column a mixture with a constant and very low nitrogen content, whereby all conditions required for the continuity of the synthesis and the aforesaid control are satisfied.

The mentioned contacting action obtained by injecting the auxiliary mixture at the upper end of the purifying column results in directly adding the gaseous phase to the gases of purification. The liquid phase however, in separating itself from the gaseous phase, drops on the mixture to be purified in order to finally free it from any trace of carbon monoxide and methane. But as the liquid phase constitutes a mixture of hydrogen and nitrogen in boiling condition, contact thereof with the hotter mixture to be purified, causes it to evaporate promptly and entirely and join the gaseous phase and thus aid the later to increase the weight of the gases of purification and their capacity to produce work and cold and, hence, to purify. A feature of the very low nitrogen content of the issuing gases is that they may be expanded with production of work without danger of solidifying nitrogen within the expanding apparatus. The increase of the weight of the purified gases produces, however a corresponding increase of cold which, being utilized for indirectly cooling the mixture to be purified or for condensing carbon monoxide and methane reduces the amount of liquid mixture required for completing the purification proportionally with the diminished weight of gaseous carbon monoxide and methane residuals within the mixture to be purified.

The addition of the gaseous and re-evaporated liquid phases to the purified gases permits, moreover of intensifying the production of cold without the aid of auxiliary machines so that, the metallic masses being reduced to a minimum the starting of the plant will be accelerated. There are thus multiple purposes which the apparatus in question is adapted to realize.

Having thus indicated the purposes and characteristics of the invention we may now explain the manner of applying it, and refer again to the annexed figure which represents a manner of carrying the process into practice for the most simple case, that of water gas, as already indicated.

It will be understood, however, that the invention is neither confined to the nature of the gas to be treated nor to the apparatus specified in this example, as it is only given in order to refer to a case that is plain and apt for a better understanding of the merit of the invention. This premised, we proceed to a more detailed description of the process.

The preliminary and customary removal of hydrogen sulfide, carbon dioxide, sulfur dioxide and water vapor is not illustrated in the drawing. The mixture, compressed at a suitably high pressure, enters the heat exchange apparatus S at 1, where it exchanges heat with a stream of relatively pure hydrogen delivered into the same apparatus through port 10 and pipe 11 and with a certain portion of extremely cold carbon monoxide and nitrogen supplied by the pipe 14, and is cooled down to a temperature at which the liquefaction of the carbon monoxide commences. The depurated gas issuing from the heat exchange apparatus S flows through pipe 4 and port 5 into the depuration column $C_R$ and bubbles through the liquid, a little colder than the gas itself, contained in the pans $P_1$; a small portion of the carbon monoxide liquefies and drops to the bottom together with the remaining carbon monoxide that has condensed in the upper portion of the column. Due to said bubbling, the whole of the liquid hydrogen and most of the liquid nitrogen condensed in the upper, much colder portions of the column and contained in the pans $P_1$ reevaporate, whereas the nearly pure carbon monoxide collects in L. The tube 12 leads the carbon monoxide, along with a small amount of liquid nitrogen contained in L, to the expansion cock $R_2$, which reduces the pressure and temperature of the said liquid gases to a very low value.

The expanded liquid enters the vaporizer F through port 13 where it cools down a portion of the surface of the tube nest T of the counter-current apparatus, whereas the portion of the tube surfaces forming part of the heat exchange apparatus O are cooled down by still colder hydrogen entering through 9 and issuing through 10. The gaseous mixture, still rich in carbon monoxide, leaving the bottom rectifier rises up inside of the tubes T where, due to the simultaneous action of the cold transmitted by the outside liquid of F and by the rain of extremely cold liquid nitrogen separating (as will be explained later on) from the additional physical system let into the column $C_R$ at the top, the greater portion of the carbon monoxide condenses so that the gaseous mixture leaving the counter-current apparatus is quite poor in monoxide, that is to say it contains nearly the whole of the hydrogen present in the original water gas and only a small amount (2 to 3%) of carbon monoxide. The condensed carbon monoxide falls on the pans $P_1$ together with the nitrogen which has failed to reevaporate and a small amount of hydrogen that has liquefied in the said tube nest T. The liquid monoxide and liquid nitrogen contained in the pans $P_1$ serve to produce the preliminary liquefaction of the carbon monoxide as already indicated. The upper portion of the tube nest T is cooled by the bath of liquid hydrogen B dropping from the directly overlying pans $P_2$. The liquid and cold nitrogen dropping in rain form in the tubes of the reflux apparatus acts on a mixture which is rich in carbon monoxide and converts it into a mixture quite poor in said gas. This mixture (containing nearly the whole of the original hydrogen of the water gas and the nitrogen that has re-evaporated in the tube nest T and pans $P_1$) on traversing the top pans $P_2$ is subjected to the analyzing action of a liquid mixture of hydrogen and nitrogen poured into the column at 18 at a temperature below $-210°$ C. together with the corresponding gaseous phase; the two phases entering at 18 constituting the additional physical system mentioned above. The liquid phase of the additional system, falling on the pans P, determines the formation of liquid mixtures of nitrogen, hydrogen and insignificant amounts of carbon monoxide, the ebullition point of which mixtures increases from the column top downwards. On bubbling through these mixtures, the mixture that is already quite poor in carbon monoxide definitely loses all traces of this gas by condensation, so that through 6 there issues hydrogen containing only a small amount of nitrogen.

The reevaporated hydrogen and nitrogen leaving the column under pressure through the pipe 19 traverse the cock $R_1$, exchange heat in $S_4$ and are then led by pipe 20 to the heat exchange apparatus $S_2$ and finally by pipe 21 to the expanding apparatus E, where they expand to atmospheric pressure, thereby developing external work and cooling down to about $-215°$ C. The heat exchange apparatus $S_4$ and $S_2$ respectively cool down the bath B and the additional physical system, which consists of gaseous hydrogen and nitrogen, this system circulating at the outside of $S_2$ and being supplied by the pipe 24. From —d— through pipe 23 and cock R a small amount of gaseous nitrogen and hydrogen in the same proportions as in the additional system and at the temperature of the surrounding air can be sent to mingle at (—a—) with the gaseous mixture supplied by the pipe 21, to effect adjustment of the temperature at the inlet and outlet of the expanding apparatus, and thereby determining the frigories available in the mixture issuing from E.

The expanded gases at a temperature of about $-215°$ C. are held by pipe 7 into the external tube of the heat exchange apparatus $S_3$, where they bring a partial liquefaction of the additional mixture supplied by pipe 25 and flowing through the inner pipe of $S_3$, thus engendering the additional physical system consisting of a liquid phase and of a gaseous phase of definite composition (as stated), the liquid phase constituting the liquid mixture of hydrogen and nitrogen falling on the rectifying pans $P_2$. The expanded gases issuing from $S_3$ go through pipe 8 and port 9 to cool the heat exchange apparatus O as already stated, and are then led through 10 and 11 to the heat exchange apparatus S, where they cool down the water gas, and finally issue at 3 where hydrogen free from carbon monoxide can be collected.

Of the gases produced by the liquid that evaporates in F, a portion flows through 14 and regulating cock $R_3$ to the inner tube of S, cools down the water gas and issues at 2; the remainder, instead, is led through pipe 15 to the regulating cock $R_4$ and pipe 22 to the outer pipe of $S_1$ where it cools down the additional or auxiliary mixture and issues at 16. The auxiliary mixture is made up of gaseous hydrogen and nitrogen in definite amounts and composition (as already stated) and is compressed by C, cooled down in the heat exchange apparatus $S_1$ and $S_2$, partly liquefied in $S_3$ and thus transformed into a physical system consisting of a liquid phase and a gaseous phase in contact and in equilibrium with each other. This physical system or these phases is led through cock $R_6$ to the top of column $C_R$ and delivered thereinto through 18. Of the two said phases only the liquid one, falling into the pans $P_2$, participates in the rectification of the ascending mixture, which it definitely frees from the carbon monoxide.

Of the mixture compressed by C only a portion, viz, that passing through $R_5$, is let into the heat exchange apparatus $S_1$ and then into $S_2$ and $S_3$; this is just the portion forming the additional physical system from which (as already stated) the rectifying liquid mixture is derived.

The pans $P_1$ chiefly serve to recover hydrogen by evaporating it and thereby to increase the economy coefficient of the process; the pans $P_2$ on the other hand serve to complete the depuration from carbon monoxide, because in these pans a rectification takes place at a high pressure pushed to an extremely low temperature, the lowest thus far practically attained in regular industrial operation.

The complete recovery of the hydrogen; the perfect depuration from carbon monoxide (and methane, when present), and the maximum degree of safety from any danger of the carbon monoxide nitrogen (and methane, if any) freezing inside of the column are the actual results practically attainable with the process according to the present invention.

Having now particularly described and ascertained the nature of my said invention and in what manner the same is to be performed, I declare that what I claim is:—

1. The process of producing from an initial gaseous mixture containing hydrogen and undesirable gases such as carbon monoxide and methane, the element hydrogen in a relatively high state of purity free from said undesirable gases, which consists in the steps of highly compressing said initial gaseous mixture, partially liquefying another independent gaseous mixture containing predetermined amounts of hydrogen and nitrogen in order to produce an auxiliary cooling and rectifying mixture having a liquid portion and a gaseous portion in mutual contact and equilibrium, exposing the said initial gaseous mixture at high pressure to conductive thermal contact with the expanded and cooled hydrogen of the final output stage of the process, whereby to partially liquefy said initial gaseous mixture, washing said initial gaseous mixture by directly exposing the same to physical contact with the hydrogen and nitrogen constituting the liquid portion of said auxiliary cooling and rectifying mixture, intermingling the hydrogen and nitrogen constituting the gaseous phase of the auxiliary cooling mixture with the gases arising from the treated mixture as a result of the purifying process carried out in the last named step, whereby to obtain both purified hydrogen and a mixture of hydrogen and nitrogen for further use as auxiliary cooling and rectifying mixture, adding further amounts of hydrogen and nitrogen to said hydrogen-nitrogen mixture in order to augment the same and to control the temperature thereof and finally expanding said augmented hydrogen-nitrogen mixture for use in the initial cooling of the compressed mixture and collecting the end products of the process.

2. The process of producing a relatively pure hydrogen from an initial gaseous mixture containing hydrogen and undesirable gases such as carbon monoxide and methane, which consists in compressing said initial mixture under high pressure, partially liquefying under high pressure another independent gaseous mixture containing predetermined amounts of hydrogen and nitrogen in order to provide an auxiliary cooling and rectifying mixture which will have a liquid portion and a gaseous portion in mutual contact and equilibrium, partially liquefying the initial gaseous mixture by heat conductive contact with very cold expanded hydrogen which is mixed with the gaseous hydrogen-nitrogen mixture of the gaseous portion of the auxiliary cooling and rectifying mixture, washing the mixture which results from the partial liquefication of the initial mixture with part of the liquid hydrogen-nitrogen mixture of the liquid portion of said auxiliary cooling and rectifying mixture prior to the re-evaporation thereof in order to remove a substantially large portion of the carbon monoxide, further washing said resulting mixture with the residual liquid part of said auxiliary cooling and rectifying mixture in order to remove substantially the remaining carbon monoxide content, recovering purified hydrogen mixed with gaseous hydrogen having a relatively low content of nitrogen and derived from said auxiliary mixture, adding further amounts of hydrogen and of nitrogen to said hydrogen-nitrogen mixture in order to augment the same and thereby control the final output temperature of the mixture, and also to increase the amounts of work and cooling effect obtained, this addition of further quantities to the mixture also serving the purpose of preventing freezing in the expansion stage, and finally expanding the mixture of hydrogen and nitrogen thus formed to produce the initial cooling and rectifying mixture, the end product of the process being in the meantime collected.

3. The process of producing a relatively pure hydrogen from an initial gaseous mixture containing hydrogen and undesirable gases such as carbon monoxide and methane, which consists in the steps of highly compressing said initial gaseous mixture, partially liquefying under high pressure another independent gaseous mixture containing predetermined amounts of hydrogen and of nitrogen in order to provide an auxiliary cooling and rectifying mixture having a liquid portion and a gaseous portion existing together in mutual contact and equilibrium, partially liquefying the initial gaseous mixture by heat conductive contact in order to remove part of the carbon monoxide, washing said partly purified initial mixture with liquid hydrogen and nitrogen and then bringing said partly purified mixture into heat conductive contact with said relatively cold expanded hydrogen in order to remove further quantities of carbon monoxide, washing said further purified mixture with a portion of the liquid hydrogen mixed with liquid nitrogen of the liqued portion of said auxiliary cooling and rectifying mixture in order to finally remove the remaining traces of carbon monoxide, simultaneously re-evaporating hydrogen from said liquid hydrogen-nitrogen mixture of the auxiliary mixture and thereby increasing the amount of the desired resulting gas which is now relatively pure hydrogen with fixed traces of nitrogen, and expanding said resulting rectifying mixture and thus obtaining work and cooling effects for further continuing the process, the desired hydrogen and product being drawn off and recovered.

Signed at Milan, (Italy), this 27th day of April, 1928.

GIOVANNI CICALI.